United States Patent [19]

Maasberg

[11] 4,272,108
[45] Jun. 9, 1981

[54] SWIVEL FOR HIGH-PRESSURE CONDUIT-CLEANING ASSEMBLY

[75] Inventor: Wolfgang Maasberg, Duisburg, Fed. Rep. of Germany

[73] Assignee: WOMA Apparatebau Wolfgang Maasberg & Co. GmbH, Duisburg, Fed. Rep. of Germany

[21] Appl. No.: 59,121

[22] Filed: Jul. 19, 1979

[30] Foreign Application Priority Data

Jul. 22, 1978 [DE] Fed. Rep. of Germany ... 7821972[U]

[51] Int. Cl.³ ............................................. F16L 27/00
[52] U.S. Cl. ....................................... 285/95; 285/98; 285/281; 285/DIG. 1
[58] Field of Search ................... 285/281, 95, DIG. 1, 285/98; 134/167 C

[56] References Cited

U.S. PATENT DOCUMENTS

| | | | |
|---|---|---|---|
| 1,669,949 | 5/1928 | Reynolds | 285/95 |
| 1,919,365 | 7/1933 | Gilsenan | 285/281 X |
| 3,680,895 | 8/1972 | Herbert et al. | 285/DIG. 1 X |
| 3,776,578 | 12/1973 | Jessup et al. | 285/281 X |

FOREIGN PATENT DOCUMENTS

| | | | |
|---|---|---|---|
| 518930 | 3/1940 | United Kingdom | 285/281 |
| 996228 | 6/1965 | United Kingdom | 285/95 |

*Primary Examiner*—Thomas F. Callghan
*Attorney, Agent, or Firm*—Karl F. Ross

[57] ABSTRACT

A conduit-cleaning assembly has a swivel coupling connected between a high-pressure hose and a conduit-cleaning nozzle. This coupling has an outer end tube connected to the hose, an intermediate outer tube threaded with the outer end tube, and an inner tube connected to the nozzle and forming with the outer tubes an axis-defining passage for liquid to flow into the nozzle from the hose. This inner tube is partially received in the outer tubes and has an inner-tube end whose outer edge engages an annular seal whose outer periphery is locked to the outer end tube. A bearing is provided between the inner tube and the intermediate tube to allow the parts to rotate relative to each other. The annular seal has a pair of opposite pressure-equalizing surfaces both exposed to the full pressure inside the swivel.

10 Claims, 2 Drawing Figures

SWIVEL FOR HIGH-PRESSURE CONDUIT-CLEANING ASSEMBLY

FIELD OF THE INVENTION

The present invention relates to a swivel for a high-pressure conduit-cleaning assembly. More particularly this invention concerns such a swivel used in a nozzle assembly employed to clean a conduit of a sewage system or the like.

BACKGROUND OF THE INVENTION

My earlier U.S. Pat. Nos. 3,080,265 and 3,380,461 describe a system for cleaning a conduit—an underground pipe or even an open trench—of a waste-disposal or sewage system. A nozzle is mounted on the downstream end of a high-pressure conduit and has at least one backwardly open water-ejecting aperture. Water supplied under high pressure to this nozzle is therefore ejected backwardly to displace the nozzle along in a conduit to be cleaned, pulling its hose behind it. As it moves forward the nozzle loosens sludge deposits and the like inside the conduit, in particular on the conduit floor. Backward withdrawal of the nozzle, while still spraying, effectively scoops the loosened deposits up and allows them to be flushed away. Such a system is replaceable with mechanical scraping devices, as it allows the conduit to be cleaned with a relatively simple tool without running the risk of damaging the interior of the conduit.

The hose is normally held on a large reel above ground, and is unreeled as the nozzle head jets itself along the conduit being cleaned. Naturally this unreeling causes the cable to twist so that a torsion is frequently applied to the nozzle at the hose end. In a relatively simple system wherein the nozzle is perfectly symmetrical about its longitudinal axis, the resultant rotation of the nozzle is by no means disadvantageous, in fact it helps to force the nozzle through the conduit.

A self-righting nozzle such as described in my jointly filed copending application No. 059,120 must be rotated about its longitudinal axis during use. Instead this nozzle should remain in a predetermined orientation with respect to the vertical for most efficient functioning, as most of the water-ejecting apertures are arranged to be directed downwardly. This is also the case for the pipe-cleaning head described in my above-cited U.S. Pat. No. 3,380,461.

Accordingly it is known to provide a swivel coupling at the end of the hose immediately upstream of the pipe-cleaning nozzle. Such a swivel allows the hose to twist without rotating the nozzle.

Such arrangements employ extremely high pressures and flow volumes. In fact water pressures in excess of 60 atmospheres-gauge are usually employed. At the same time the nozzle and swivel are normally employed in extremely dirty conditions. As a result the hitherto used swivels have proven unsatisfactory. They have a short service life as a result of the extreme conditions they must operate under. After a relatively short time most of the known swivels leak and/or no longer swivel, so that they must be serviced or replaced.

OBJECTS OF THE INVENTION

It is therefore an object of the present invention to provide an improved swivel coupling.

Another object is to provide such a swivel coupling particularly usable in a conduit-cleaning assembly of the above described general type wherein a high-pressure hose has a hose portion connected to a portion of a conduit-cleaning nozzle.

SUMMARY OF THE INVENTION

These objects are attained according to the instant invention by constituting the swivel coupling as an outer end tube connected to the hose portion, an intermediate outer tube threaded with the outer end tube, and an inner tube connected to the nozzle portion and forming with the outer tubes an axis-defining passage for liquid flow between the portions of the hose and the conduit-cleaning nozzle. This inner tube is at least partially received in the outer tubes and has an inner-tube end in the outer tubes. A bearing, preferably a roller-type thrust bearing, is provided between the inner tube and the intermediate tube so that these two parts can rotate relative to each other about the axis of the swivel. An annular seal is engaged between the inner-tube end and the outer end tube and has a pair of opposite pressure-equalizing surfaces.

More particularly, these surfaces are of substantially the same area, projected onto a plane perpendicular to the axis, and are both exposed to the relatively high pressure inside the passage of the nozzle. Thus they form a relatively tight seal with the inner-tube end, while hardly impeding relative rotation of the inner tube and outer tubes. Even under the extremely high pressures of a conduit-cleaning system the parts to opposite sides of this swivel can rotate freely relative to each other with very little torsional force being transmitted through the swivel.

According to further features of this invention the outer end tube is screwed onto the intermediate end tube and can be axially displaced thereon by relative rotation of the two outer tubes. A lock nut is provided for arresting them relative to each other. The seal is engaged with the outer end tube, so that the force pressing the seal against the inner-tube end is whatever prestressing force is set by screwing the outer end tube onto the intermediate outer tube. This pressure can be relatively light, while still preventing leakage at this seal.

According to further features of this invention the annular seal has an outer periphery that is clamped between a shoulder of the outer end tube and a holding ring threaded inside this outer end tube. The one pressure-equalizing surface engages the outer edge of the inner-tube end in substantially line contact, the line thus formed defining one edge of the respective pressure-equalizing surface. The inner periphery of this seal forms a smooth continuation of the inner wall of the outer end tube which is formed with an annular chamber at the other of these surfaces and with a bore communicating between this chamber and the interior of the outer end tube upstream of the seal.

Such pressurization of the two-pressure-equalizing surfaces which according to this invention extend at an angle of approximately 45° to the assembly axis, ensures that this seal will be held extremely steadily, and will bear with sufficient force on the inner tube end to prevent leakage while still readily permitting relative rotation. The swivel will therefore allow a nozzle connected to its one side, normally by a short length of flexible hose, to rotate readily relative to the hose connected to its other side. In this manner the twisting of the hose inherent during its paying-out and winding up will not be effective as torsion on the cleaning nozzle.

SPECIFIC DESCRIPTION

Figure 1:
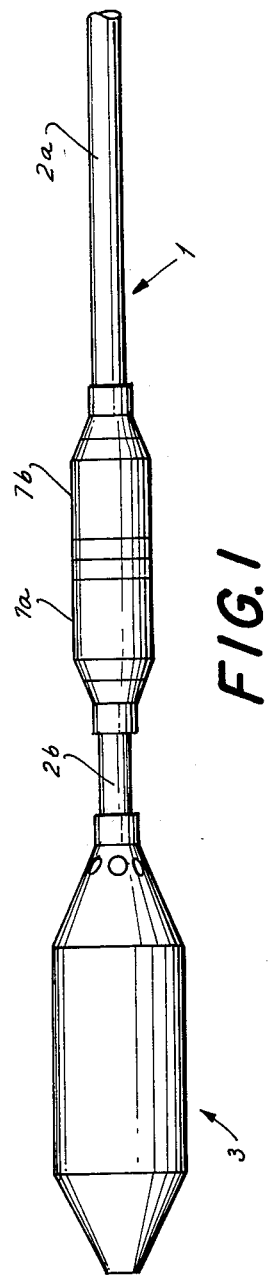
FIG. 1 is a side view of a nozzle assembly employing the swivel according to this invention.

As shown in FIG. 1 a swivel 1 according to the instant invention is connected to an upstream hose portion 2a and via a downstream hose portion 2b to a nozzle 3 of the type described in my above-cited jointly filed application.

Figure 2:
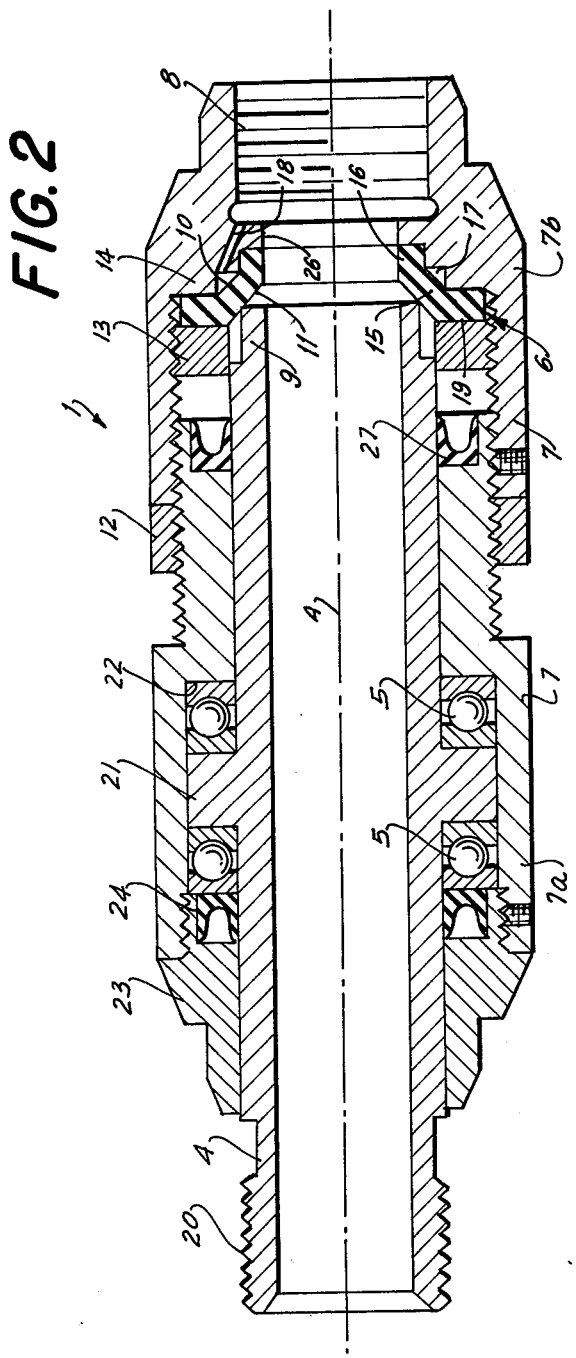
FIG. 2 is an axial section through the swivel of this invention.

The nozzle 1 as seen in FIG. 2 has an inner steel tube 4 fitted on one end with a screw connection 20 for connecting the hose portion 2b. This inner tube 4 is centered on an axis A and has a central square-section shoulder 21 flanked by a pair of thrust ball bearings 5 of an outer tube 7. More particularly the outer tube 7 has an intermediate tube part 7a formed with a shoulder 22 braced on one of the bearings 5 and a nut part 23 braced against the other of the bearings 5 and holding a gland 24 against the outside of the inner tube 4. The tube or sleeve 7 also has an outer tube 7b threaded onto the intermediate tube 7a and locked in place thereon by a lock nut 12. This outer end tube 7b is formed with a screw connection 8 for the upstream hose portion 2a.

A gland 27 is provided between the upstream end of the intermediate tube 7a and the inner tube 4 to prevent any leakage there might be from contaminating the roller bearings 5.

A seal 6 of elastomeric material has an outer periphery 19 clamped between a holding ring 13 threaded inside the outer end tube 7b and a shoulder 14 of this tube 7b. The seal 6 further has an inner peripheral portion 16 that forms a smooth continuation of the inner wall 26 of the outer end tube 7b. Finally the seal 6 has an intermediate web portion 15 formed with parallel and opposite pressure-equalizing surfaces 10 and 11. The surface 11 bears in line contact on the outer edge of the end 9 of the tube 4. The surface 10 is exposed in a triangular-section chamber 17 connected via at least one bore 18 to the passage through the tube part 7b. The projections of the surfaces 10 and 11 on a plane perpendicular to the axis A are substantially identical.

As the pressure on the surfaces 10 and 11 are substantially equal, the pressure with which the seal 6 bears on the outer edge of the end 9 will be largely determined by how far the end of tube 7b is screwed onto the intermediate tube 7a. This pressure can be relatively light, as the extremely high pressures on the surfaces 10 and 11 will hold the seal 6 very rigidly.

In practice it has been found that this swivel allows the nozzle 3 to rotate very freely about the axis A relative to the hose 2a. At the same time the bearings 5 allow relatively great axial forces to be transmitted between the hose 2a and the nozzle 3. Leakage past the seal 6 will be minimal, so that the full pressure of the water inside the hose 2a will be available for the nozzle 3.

I claim:

1. In a conduit-cleaning assembly wherein a high-pressure hose has a hose portion connected to a portion of a conduit-cleaning nozzle, a swivel coupling comprising:

an outer end tube connected to one of said portions;
an intermediate outer tube threaded with said outer end tube;
an inner tube connected to the other of said portions and forming with said outer tubes an axis-defining passage for liquid flow between said portions, said inner tube being at least partially received in said outer tubes and having an inner-tube end in said outer tubes;
a bearing between said inner tube and said intermediate outer tube for relative rotation about said axis therebetween; and
an annular seal engaged between said inner-tube end and said outer end tube and having a pair of generally axially opposite pressure-equalizing surfaces one of which engages said inner-tube end generally axially and both of which are exposed to the pressure in said passage.

2. The swivel coupling defined in claim 1 wherein said bearing is a roller bearing.

3. The swivel coupling defined in claim 1 wherein said outer end tube can be axially displaced by relative rotation about said axis, said coupling further comprising a lock nut on one of said outer tubes axially engageable with the other end of said outer tubes.

4. The swivel coupling defined in claim 1 wherein said annular seal has an inner periphery and an outer periphery, said coupling further comprising a holding ring threaded to said end outer tube and clamping said outer periphery thereagainst.

5. The swivel coupling defined in claim 4 wherein said inner-tube end has an inner edge and an outer edge, said outer edge engaging said ring at said one surface in substantially line contact.

6. The swivel coupling defined in claim 5 wherein said inner periphery of said seal forms a smooth continuation of said outer end tube.

7. The swivel coupling defined in claim 1 wherein said seal has an outer periphery clamped to said outer end tube, an inner periphery, and an intermediate portion engaging said inner-tube end substantially in line contact, said surface being of substantially identical area in projection on a plane perpendicular to said axis, one of said surfaces being radially inward of said inner-tube end and the other of said surfaces being parallel to said one surface and oppositely directed, said outer end tube being provided with means including formations for applying liquid from inside said outer end tube to said other surface.

8. The swivel coupling defined in claim 7 wherein said surfaces extend at an acute angle to said axis.

9. The swivel coupling defined in claim 1 wherein said bearing includes at least one roller-type thrust bearing.

10. In a conduit-cleaning assembly wherein a high-pressure hose has a hose portion connected to a portion of a conduit-cleaning nozzle, a swivel coupling comprising:

an outer end tube connected to one of said portions;
an intermediate outer tube threaded with said outer end tube;
an inner tube connected to the other of said portions and forming with said outer tubes an axis-defining passage for liquid flow between said portions, said inner tube being at least partially received in said outer tubes and having an inner-tube end in said outer tubes;

a bearing between said inner tube and said intermediate outer tube for relative rotation about said axis therebetween; and an annular seal engaged between said inner-tube end and said outer end tube and having a pair of opposite pressure-equalizing surfaces one of which engages said inner-tube end and the other of which forms an annular chamber with said outer end tube, said outer end tube being formed with a least one passage extending between said chamber and the interior of said outer end tube in said passage upstream of said seal, whereby both of said surfaces are exposed to the pressure in said passage.

* * * * *